United States Patent [19]

Hayashi et al.

[11] Patent Number: 5,060,477
[45] Date of Patent: Oct. 29, 1991

[54] HYDROSTATIC CONTINUOUSLY VARIABLE TRANSMISSION WITH A SET OF PUMP DISTRIBUTOR VALVES, A SET OF MOTOR DISTRIBUTOR VALVES AND A SET OF CLUTCH VALVES ARRANGED RADIATELY WITH AND CIRCUMFERENTIALLY ALTERNATING WITH THE MOTOR DISTRIBUTOR VALVES

[75] Inventors: Tsutomu Hayashi; Mitsuru Saito, both of Tokyo, Japan

[73] Assignee: Honda Giken Kogyo Kabushiki Kaisha, Tokyo, Japan

[21] Appl. No.: 615,611

[22] Filed: Nov. 19, 1990

[30] Foreign Application Priority Data

Nov. 21, 1989 [JP] Japan ................................. 1-302785

[51] Int. Cl.$^5$ .............................................. F16D 39/00
[52] U.S. Cl. ........................................ 60/488; 60/489
[58] Field of Search ................................. 60/487–490

[56] References Cited

U.S. PATENT DOCUMENTS

| | | | |
|---|---|---|---|
| 2,844,002 | 7/1958 | Pavesi | 91/480 |
| 2,984,070 | 5/1961 | Bauer | 60/449 |
| 3,165,892 | 1/1965 | Roberts | 91/499 |
| 4,735,050 | 4/1988 | Hayashi et al. | 91/506 |
| 4,745,748 | 5/1988 | Hayashi et al. | 91/506 |
| 4,748,898 | 6/1988 | Hayashi et al. | 60/487 |
| 4,781,022 | 11/1988 | Hayashi et al. | 60/490 |
| 4,827,721 | 5/1989 | Hayashi et al. | 60/487 |
| 4,845,951 | 7/1989 | Hayashi et al. | 60/489 |
| 4,914,914 | 4/1990 | Inoue | 60/489 |
| 4,916,901 | 4/1990 | Hayashi et al. | 60/487 |
| 4,938,024 | 7/1990 | Matsuto et al. | 60/487 |
| 4,951,469 | 8/1990 | Hayashi et al. | 60/487 |

Primary Examiner—Edward K. Look
Assistant Examiner—F. Daniel Lopez
Attorney, Agent, or Firm—Lyon & Lyon

[57] ABSTRACT

In a hydrostatic continuously variable transmission comprising an annular inner oil passage and an annular outer oil passage which are formed in the cylinder block between a large number of cylinder bores in the pump cylinder and a large number of cylinder bores in the motor cylinder so as to surround an axis of the cylinder block, large numbers of first and second distributor valves disposed radiately in the cylinder block and adapted to be reciprocally moved radially of the cylinder block, and a first and a second eccentric ring engaged with the first and second distributor valves, respectively, a large number of clutch valves are arranged radiately and circumferentially alternatively with the second distributor valves in the cylinder block and adapted to be reciprocally moved between radially inner and outer positions in the cylinder block to short-circuit the oil passages when the reciprocation stroke thereof exceeds a given value. The clutch valves are engaged with the second eccentric ring together with the second distributor valves, and the second eccentric ring are movable so that it can be moved between a clutch-on position in which it provides a normal reciprocal movement to the second distributor valves and a clutch-off position in which the clutch valves are reciprocally moved to a position to short-circuit the oil passage.

4 Claims, 8 Drawing Sheets

5,060,477

HYDROSTATIC CONTINUOUSLY VARIABLE TRANSMISSION WITH A SET OF PUMP DISTRIBUTOR VALVES, A SET OF MOTOR DISTRIBUTOR VALVES AND A SET OF CLUTCH VALVES ARRANGED RADIATELY WITH AND CIRCUMFERENTIALLY ALTERNATING WITH THE MOTOR DISTRIBUTOR VALVES

BACKGROUND OF THE INVENTION

1. Field of the Invention

The field of the present invention is improvements in hydrostatic continuously variable transmissions comprising a pump cylinder in a hydraulic pump and a motor cylinder in a hydraulic motor, which cylinders are coaxially integrally coupled with each other to form a cylinder block, an annular inner oil passage and an annular outer oil passage which are formed in the cylinder block between a large number of cylinder bores provided in an annular arrangement in the pump cylinder and a large number of cylinder bores provided in an annular arrangement in the motor cylinder, so as to surround an axis of the cylinder block, a large number of first distributor valves disposed radiately in the cylinder block and adapted to be reciprocally moved radially of the cylinder block to put the large number of cylinder bores in the pump cylinder into alternate communication with the oil passages, a large number of second distributor valves disposed radiately in the cylinder block and adapted to be reciprocally moved radially of the cylinder block to put the large number of cylinder bores in the motor cylinder into alternate communication with the oil passages, a first eccentric ring engaged with the first distributor valves for providing the reciprocal movement to the first distributor valves in response to relative rotation between the cylinder block and an input member of the hydraulic pump, and a second eccentric ring engaged with the second distributor valves for providing the reciprocal movement to the second distributor valves in response to the rotation of the cylinder block, so that each cylinder bore in the pump cylinder is put into communication with the one inner oil passage in its discharge stroke and into communication with the other oil passage in its intake stroke, while each cylinder bore in the motor cylinder is put into communication with the one oil passage in its expansion stroke and into communication with the other oil passage in its contraction stroke, thereby providing the transmission of power between the hydraulic pump and the hydraulic motor through a hydraulic pressure.

2. Description of the Prior Art

Such a hydrostatic continuously variable transmission is already known, as disclosed, for example, in Japanese Patent Application Laid-open No. 20959/87.

In the continuously variable transmission disclosed in that publication, in order to freely changeover the hydraulic pump and the hydraulic motor between a power transmitting condition and a power interrupting condition, a large number of clutch valves are disposed radiately in axial arrangement with the first and second distributor valves for providing the opening and closing between the inner and outer passages by the radial movement thereof and adapted to be opened and closed by a third eccentric ring.

In such a transmission, however, there is a problem of a complication in structure, because the cylinder block and thus the transmission cannot be avoided from being increased in axial size and moreover, the three eccentric rings are required, from the fact that the three types of the first and second distributor valves and the clutch valves are axially disposed.

SUMMARY OF THE INVENTION

Accordingly, it is an object of the present invention to provide a hydrostatic continuously variable transmission of the type described above, which enables the disposition of the clutch valves without bringing about any increase in size of the cylinder block and moreover, is simple in structure.

To achieve the above object, the feature of the present invention is in that a large number of clutch valves are arranged radiately with and circumferentially alternating with the second distributor valves in the cylinder block and adapted to be reciprocally moved between radially inner and outer positions in the cylinder block to short-circuit the oil passages when a reciprocation stroke of each clutch valve exceeds a given value, the clutch valves being engaged with the second eccentric ring together with the second distributor valves, and the second eccentric ring being movable between a clutch-on position providing a normal reciprocal movement to the second distributor valves and a clutch-off position moving the clutch valves reciprocally to a position to short-circuit the oil passages.

With the above construction, the clutch valve is disposed utilizing a space between the adjacent second distributor valves and therefore, despite the presence of the clutch valves, it is not necessary to particularly increase the axial length of the cylinder block. In addition, the clutch valves are operated together with the second distributor valves by the second eccentric ring and therefore, it is also not necessary to provide an eccentric ring exclusively used for the clutch valves. Thus, it is possible to provide a hydrostatic continuously variable transmission which is compact and simple in structure.

Each the clutch valve is provided with a restriction for gradually reducing an area of a short-circuited flow path between the oil passages as the second eccentric ring is displaced from a position adjacent the clutch-on position to the clutch-off position. This ensures that a semi-clutch condition can be easily obtained by gradually restricting the communication between the inner and outer oil passages when the second eccentric ring is displaced from the clutch-on position to the clutch-off position.

Further, the second distributor valve is constructed to short-circuit the oil passages in the clutch-off position of the second eccentric ring. Thus, the flow resistance in the short-circuited system can be extremely reduced by allowing the second distributor valve together with the clutch valve to participate in short-circuiting of the inner and outer oil passages, thereby suppressing the pulsation of pressure due to the operation of the hydraulic pump to provide a stable clutch-on condition.

The above and other objects, features and advantages of the invention will become apparent from a reading of the following description of the preferred embodiments, taken in conjunction with the accompanying drawings.

DESCRIPTION OF THE PREFERRED EMBODIMENTS

The present invention will now be described by way of one embodiment with reference to the accompanying drawings.

Figure 1:
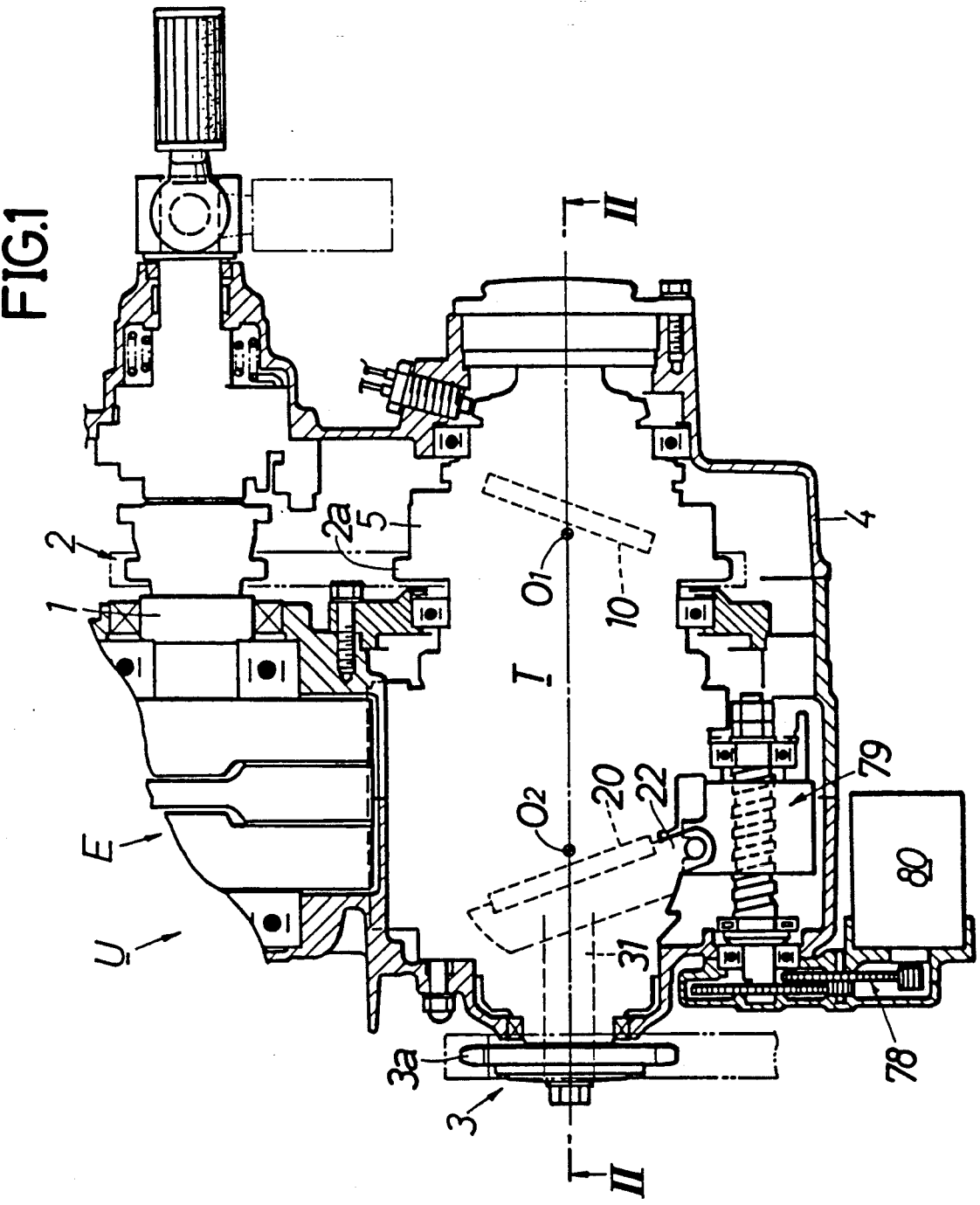
FIG. 1 is a plan view of a power unit for a motorcycle.

Referring first to FIG. 1, a power unit U for a motorcycle is comprised of an engine E and a hydrostatic continuously variable transmission T. A crankshaft 1 of the engine E and the transmission T are contained and supported in a common casing 4. The continuously variable transmission T includes a cylindrical input shaft 5 and an output shaft 31 both disposed in parallel to the crankshaft 1. Thus, the crankshaft 1 drives the cylindrical input shaft 5 through a primary reduction gear 2, and the output shaft 31 drives a rear wheel (not shown) of the motorcycle through a secondary reduction gear 3.

Figure 2:
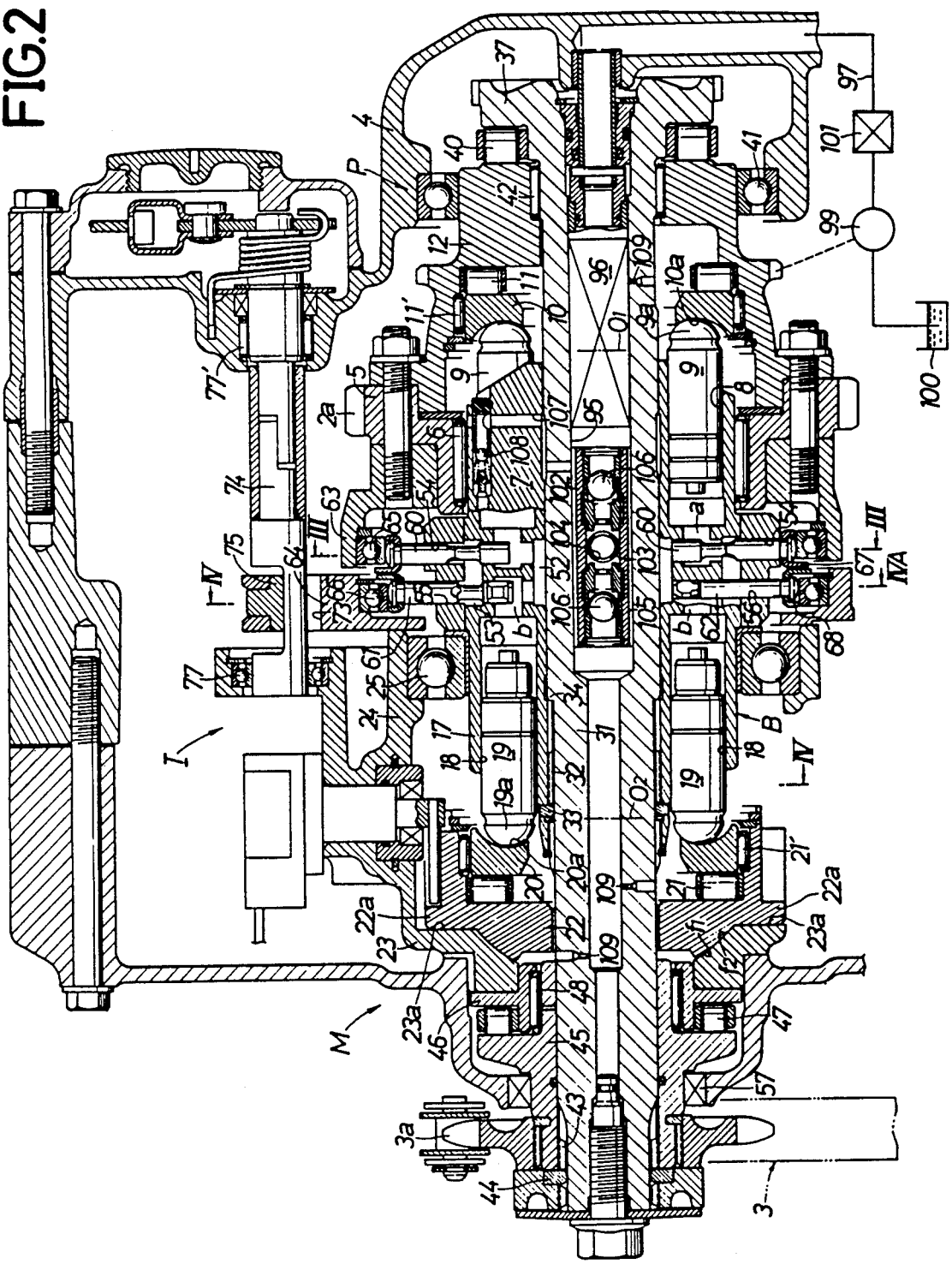
FIG. 2 is an enlarged sectional view taken along a line II—II in FIG. 1.

Referring to FIG. 2, the continuously variable transmission T is comprised of a constant displacement type swashplate hydraulic pump P and a variable displacement type swashplate hydraulic motor M.

The hydraulic pump P is comprised of the cylindrical input shaft 5 as an input member provided with an output sprocket 2a of the primary reduction gear 2, a pump cylinder 7 relatively rotatably received in an inner peripheral wall of the cylindrical input shaft 5 with a needle bearing 6 interposed therebetween, a number of pump plungers 9, 9 --- each slidably received in corresponding one of a large odd number of cylinder bores 8, 8 ---provided in an annular arrangement in the pump cylinder 7 to surround a rotational axis of the pump cylinder 7, a pump swashplate 10 with its front face abutting against outer ends of the pump plungers 9, 9 ---, and a pump swashplate holder 12 for supporting the pump swashplate 10 through a thrust bearing 11 and a radial bearing 11' to hold the pump swashplate 10 inclined at a given angle with respect to the axis of the pump cylinder 7 about a phantom trunnion axis $O_1$ perpendicular to the axis of the pump cylinder 7. The pump swashplate holder 12 is coupled to the cylindrical input shaft 5.

The pump swashplate 10 is capable of providing the reciprocal movement to the pump plungers 9, 9 --- during rotation of the cylindrical input shaft 5 to repeat intake and discharge strokes.

On the other hand, the hydraulic motor M is comprised of a motor cylinder 17 disposed on the same axis as the pump cylinder 7 and on the left side of the pump cylinder 7, a large number of motor plungers 19, 19 --- each slidably received in corresponding one of the same number of cylinder bores 18, 18 --- as the cylinder bores 8, 8 --- provided in the motor cylinder 17 to surround a rotational axis of the motor cylinder 17, a motor swashplate 20 with its front face abutting against the outer ends of the motor plungers 19, 19 ---, a motor swashplate holder 22 for supporting the motor swashplate 20 through a thrust bearing 21 and a radial bearing 21', and a motor swashplate anchor 23 for bearing a back of the motor swashplate holder 22. That opposed surfaces $f_1$ and $f_2$ of the motor swashplate holder 22 and the motor swashplate anchor 23 which abut against each other are each formed into a spherical surface having a center provided by a point of intersection of the axis of the motor cylinder 17 with a trunnion axis $O_2$. The motor swashplate holder 22 is also integrally provided at its opposite ends with a pair of semi-cylindrical trunnion shafts 22a, 22a disposed on the trunnion axis $O_2$ perpendicular to the rotational axis of the motor cylinder 17. The trunnion shafts 22a, 22a are rotatably received in a pair of semi-cylindrical recesses 23a, 23a provided at opposite ends of the motor swashplate anchor 23, respectively.

A cylindrically-shaped cylinder holder 24 is integrally connected to a right end of the motor swashplate anchor 23 to rotatably support the outer peripheral surface of the motor cylinder 17 through a ball bearing 25.

The motor swashplate 20 is adapted to be moved between an upright position in which it is at a right angle to the axis of the motor cylinder 17 and a most inclined position in which it is inclined at a certain angle, by rotating the motor swashplate holder 22 about the trunnion axis $O_2$ through a reducing bear train 78 and a ball screw mechanism 79 by a pulse motor 80 (see FIG. 1), and when in its inclined state, the motor swashplate 20 can provide the reciprocal movement to the motor plungers 19, 19 --- with the rotation of the motor cylinder 17 to repeat expansion and contraction strokes.

The pump cylinder 7 and the motor cylinder 17 are intergrally coupled to each other to form a cylinder block B through which the output shaft 31 is centrally passed. The cylinder block B is spline-connected to the output shaft 31 and fixed on the output shaft 31 by an annular shoulder 34 provided around the outer periphery of the output shaft 31 and a split stopper ring 33.

The right end of the output shaft 31 also passes through the pump swashplate 10 and the pump swashplate holder 12 and is integrally provided with a hightly rigid flange 37 for supporting a back of the pump swashplate holder 12 through a thrust bearing 40. The output shaft 31 also rotatably supports the pump swashplate holder 12 through a needle bearing 42.

The left end of the output shaft 31 extends through the motor swashplate 20, the motor swashplate holder 22 and the motor swashplate anchor 23, and in sequence from the side of the swashplate anchor 23, a retainer 46 and a thrust roller bearing 47 are interposed between the motor swashplate anchor 23 and a cylindrical support 45 which is spline-connected to the outer pheriphery of the left end of the output shaft 31 and secured thereto by a split cotter 44. The output shaft 31 is also rotatably supported on the swashplate anchor 23 through a needle bearing 48 and the retainer 46. The input sprocket 3a of the secondary reduction gear 3 is attached to the output shaft 31 through the cylindrical support 45.

In this manner, all the components from the cylindrical input shaft 5 to the output shaft 31 for the transmission T are constructed as a single assembly and assembled to the casing 4.

During assembling of the transmission T to the casing 4, the pump swashplate holder 12 is supported on a right sidewall of the casing 4 through the ball bearing 41. An oil seal 57 is fitted into a left sidewall of the casing 4 to come into close contact with the outer peripheral surface of the cylindrical support 45.

In order to rotate the pump swashplate 10 synchronously with the pump cylinder 7, the pump swashplate 10 is provided with the spherical recess 10a in which a spherical end 9a of the corresponding pump plunger 9 is engaged.

In addition, in order to rotate the motor swashplate 20 synchronously with the motor cylinder 17, the motor swashplate 20 is provided with a spherical recess 20a in which a spherical end 19a of the corresponding motor plunger 19 is engaged.

Any of the spherical recesses 10a and 20a is formed with a radius larger than the radius of the corresponding spherical end 9a, 19a, so that the engagement thereof with the spherical end 9a, 19a may be insured in any position.

Figure 4:
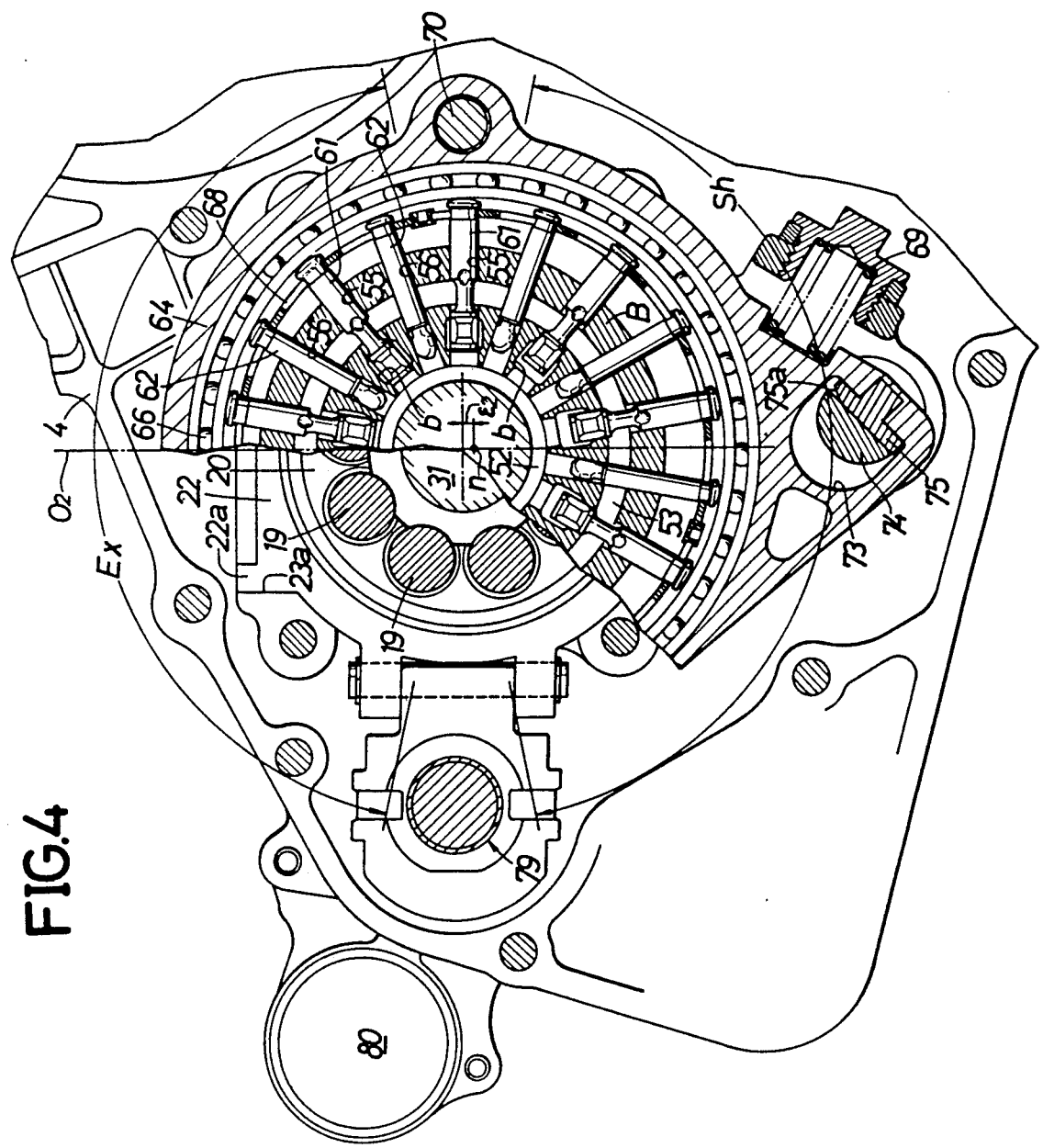
FIG. 4 is a sectional view taken along a line IV—IV in FIG. 2 but in a clutch-on condition.
Figure 4A:
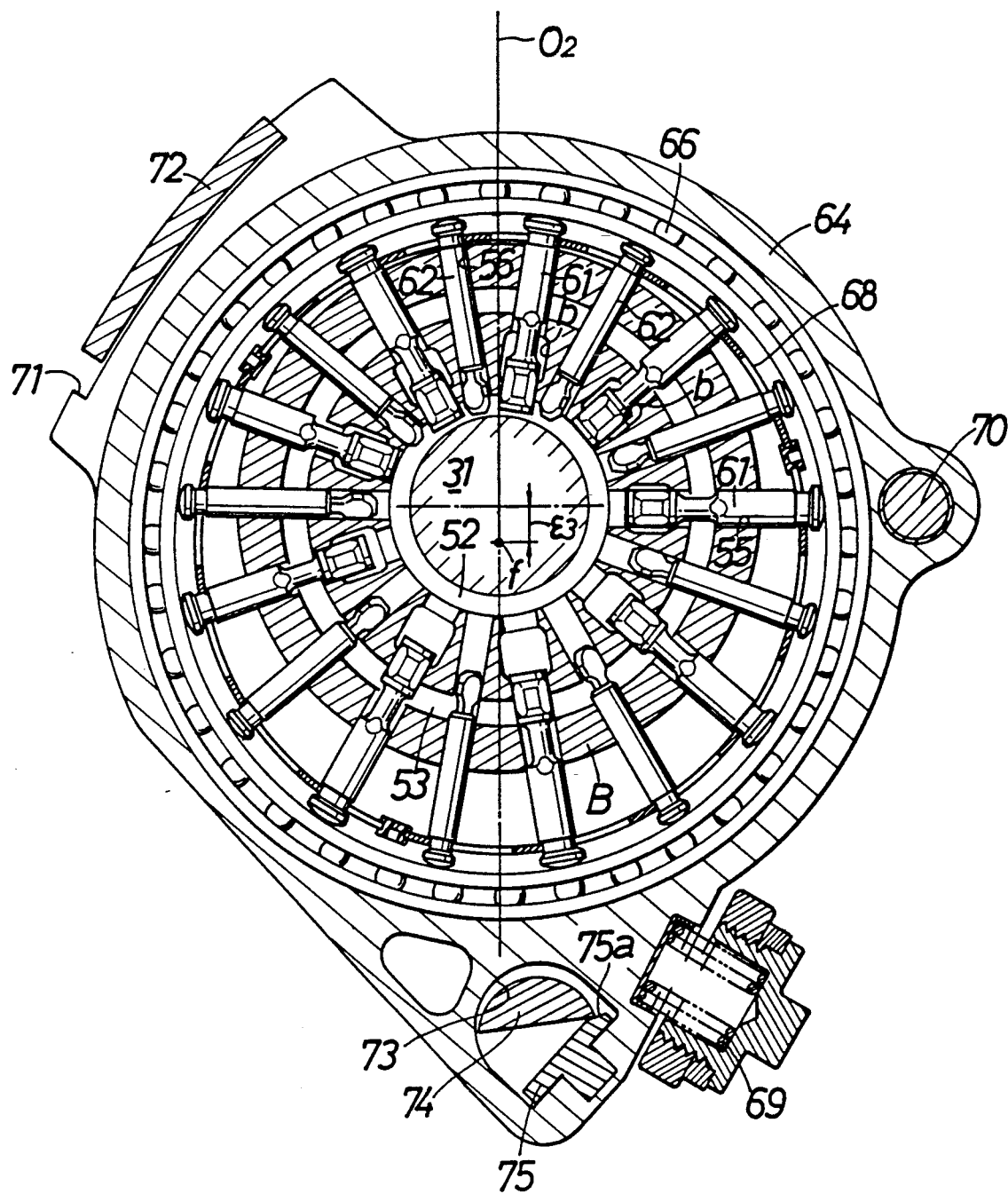
FIG. 4A is a sectional view taken along a line IV—IVA in FIG. 2 but in a clutch-off condition.
Figure 5:
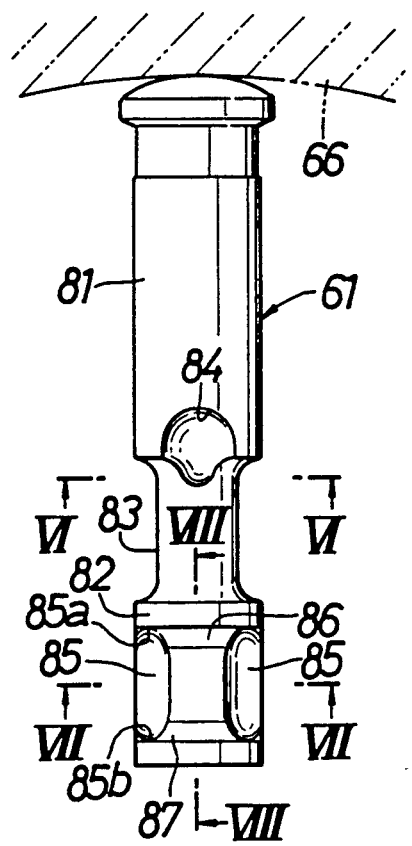
FIG. 5 is a side view of a second distributor valve.
Figure 6:
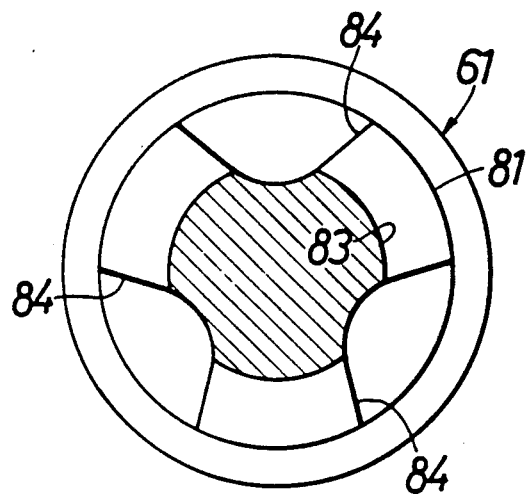
FIGS. 6, 7 and 8 are enlarged sectional views taken along lines VI—VI, VII—VII and VIII—VIII in FIG. 5, respectively.
Figure 7:
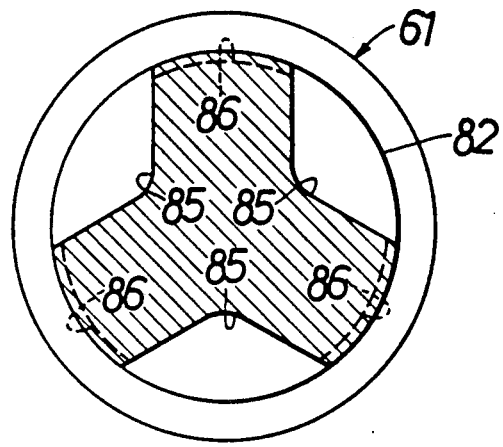

Referring to FIGS. 2 and 4A, between the group of the cylinder bores 8, 8 --- in the pump cylinder 7 and the group of the cylinder bores 18, 18 --- in the motor cylinder 17, the cylinder block B is provided with an annular inner oil passage 52 and outer oil passage 53 which are concentrically arranged about the output shaft 31, and with the same numbers of first, second and third valve bores 54 ---, 55 --- and 56 --- as the cylinder bores 8, 8 ---, radiately extending through an annular partition wall between the oil passages 52 and 53 and through an outer peripheral wall of the outer oil passage 53. In this case, the first and second valve bores 54, 54 --- and 55, 55 --- are arranged with the former placed on the side of the cylinder bores 8, 8 ---, and the second and third valve bores 55, 55 --- and 56, 56 --- are disposed alternately in a circumferential direction of the cylinder block B.

The cylinder block B is further provided with pump ports a, a --- permitting the communication between the adjacent cylinder bores 8, 8 --- and first valve bores 54, 54 ---, and a large number of motor ports b, b --- permitting the communication between the adjacent cylinder bores 18, 18 --- and second valve bores 55, 55 ---.

The inner oil passage 52 is formed as an annular groove in the inner peripheral surface of the cylinder block B, with its open surface being closed by the outer peripheral surface of the output shaft 31.

First spool-type distributor valves 60, 60 --- are slidably received in the first valve bores 54, 54 ---, respectively; second spool-type distributor valves 61, 61 --- are slidably received in the second valve bores 55, 55 ---, respectively; and spool-type clutch valves 62, 62 --- are slidably received in the third valve bores 56, 56 ---, respectively. A first eccentric ring 63 is engaged with outer ends of the first distributors 60, 60 --- through ball bearings 65 to surround them, and a second eccentric ring 64 is engaged with outer ends of the second distributor valves 61, 61 --- and the clutch valves 62, 62 --- through ball bearings 66 to surround them. In order to force such engagements, the outer ends of the first distributor valves 60, 60 --- are interconnected by a first forcing ring 67 concentric with the first eccentric ring 63, and the outer ends of the second distributor valves 61, 61 --- and the clutch valves 62, 62 --- are interconnected by a second forcing ring 68 concentric with the second eccentric ring 64.

Figure 3:
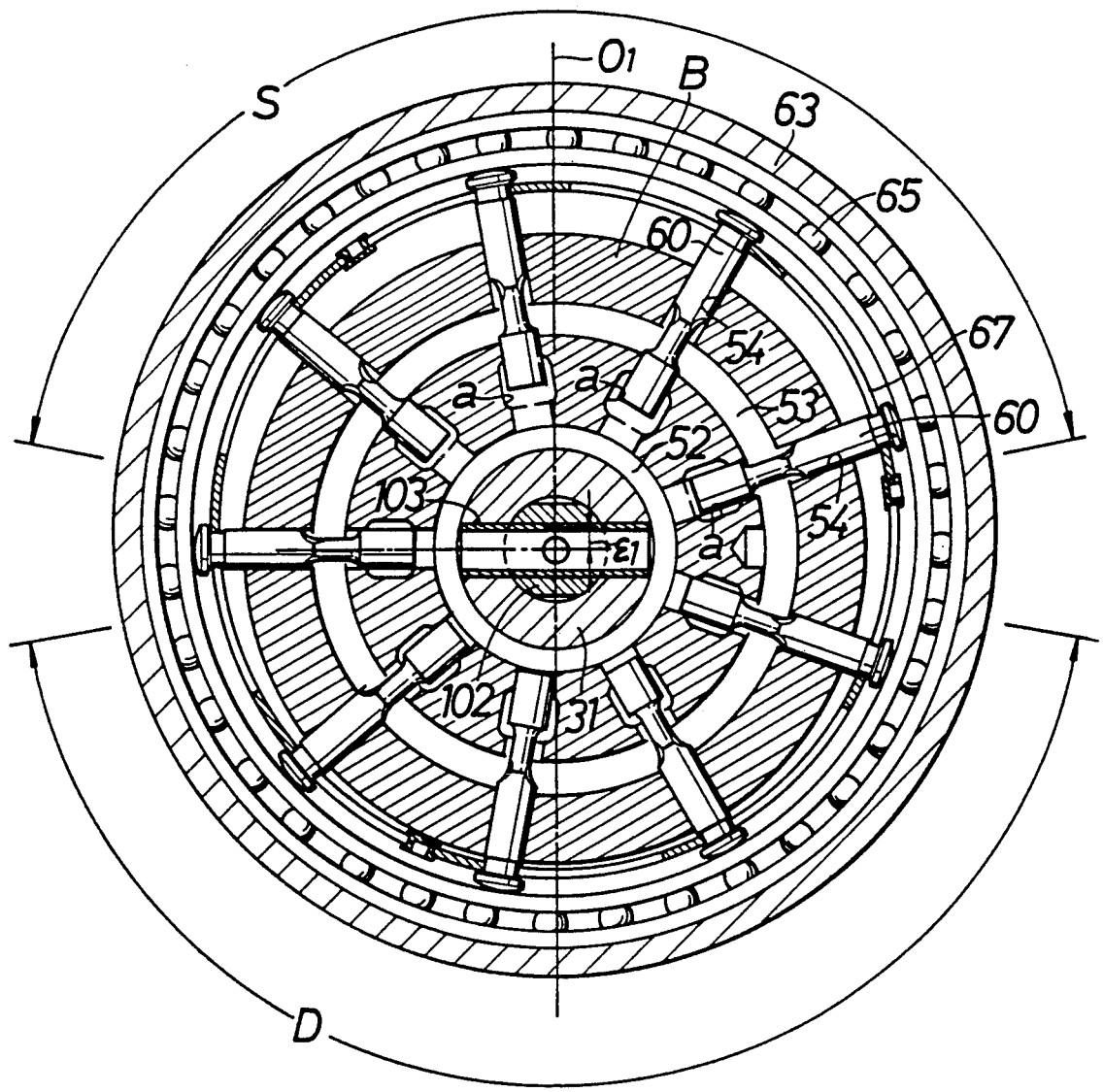
FIG. 3 is a sectional view taken along a line III—III in FIG. 2.

The first eccentric ring 63 is secured to the cylindrical input shaft 5 and held at a location eccentrically displaced by a predetermined distance $\epsilon_1$ from the center of the output shaft 31 along the phantom trunnion axis $O_1$, as shown in FIG. 3.

If relative rotation is produced between the cylindrical input shaft 5 and the pump cylinder 7, each distributor valve 60 is reciprocally moved in the first valve bore 54 between radially inner and outer positions in the pump cylinder 7 with a stroke of a distance two times an eccentric amount $\epsilon_1$ by the first eccentric ring 63. As shown in FIG. 3, in a discharge region D of the hydraulic pump P, the first distributor valve 60 is moved in the inner position to put the corresponding pump port a into communication with the outer oil passage 53 and out of communication with the inner oil passage 52, so that a working oil is pumped from the cylinder bore 8 into the outer oil passage 53 by the pump plunger 9 which is in its discharge stroke. In an intake region S, the first distributor valve 60 is moved in the outer position to put the corresponding pump port a into communication with the inner oil passage 52 and out of communication with the outer oil passage 53, so that the working oil is drawn from the inner oil passage 52 into the cylinder bore 8 by the pump plunger 9 which is in its intake stroke.

The second eccentric ring 64 is connected to the cylinder holder 24 through a pivot 70 parallel to the output shaft 31 for swinging movement between a clutch-on position n (a position shown in FIG. 4) and a clutch-off position f (a position shown in FIG. 4A). When in the clutch-on position n, the second eccentric ring 64 assumes a location eccentrical by a predetermined distance $\epsilon_2$ from the center of the output shaft 31 along the trunnion axis $O_2$, and when in the clutch-off position f, it assumes a location eccentric by a distance $\epsilon_3$ larger than the eccentric amount $\epsilon_2$ from the center of the output shaft 31. To regulate the location of the second eccentric ring 64, the outer peripheral surface of the second eccentric ring 64 is provided with a notch 71, and the casing 4 is integrally provided with a stopper 72 which is capable of engaging opposite inner end faces of the notch 71. Thus, the clutch-on position n of the second eccentric ring 64 is regulated by the engagement of the stopper 72 with one of the inner end faces of the notch 71, and the clutch-off position f is regulated by the engagement of the stopper 72 with the other end face of the notch 71.

Referring again to FIGS. 2 and 4A, a cam shaft 74 disposed in parallel to the output shaft 31 is inserted through a through hole 73 provided in one side of the second eccentric ring 64, and a slipper plate 75 engaging with the cam shaft 74 is secured to the second eccentric ring 64 to cover one side face in the through hole 73.

The slipper plate 75 is provided at a corner thereof with a slant 75a with which the cam shaft 74 is engaged when it is rotated through a predetermined angle.

As shown in FIG. 2, the cam shaft 74 is carried on the casing 4 through a pair of left and right bearings 77 and 77' and desinged so that if it is rotated by the operation of a clutch lever (not shown), it urges the slipper plate 75 to enable the eccentric ring 64 to swing into the clutch-off position f.

As shown in FIGS. 4 and 4A, a clutch spring 69 is connected to the second eccentric ring 64 for biasing the second eccentric ring 64 toward the clutch-on position n. Thus, if the cam shaft 74 is operated to be retreated from the slipper plate 75, the second eccentric ring 64 can be swung into the clutch-on position n with a force of the clutch spring 69.

The structures of the second distributor valve 61 and the clutch valve 62 will be described below in detail.

First, the second distributor valve 61, as shown in FIGS. 5 to 8, comprises a first land 81 having a longer axial length, a second land 82 having a shorter axial length, and an annular groove 83 extending between the lands 81 and 82. A plurality of notches 84 are provided on that edge of the first land which is closer to the annular groove 83. A plurality of axially extending recessed grooves 85 --- are provided in an outer peripheral surface of the second land 82 at circumferentially equally spaced apart distances. In this case, opposite inner and outer ends 85a and 85b of each recessed groove 85 is formed into a shape gradually reduced in sectional area toward its extremity, e.g., a semi-circular shape. The inner semi-circular ends 85a communicate with one another through a first circumferential groove 86 in the second land 82, and the outer semi-circular ends 85b communicate with one another through a second circumferential groove 87 in the second land 82.

Figure 8:
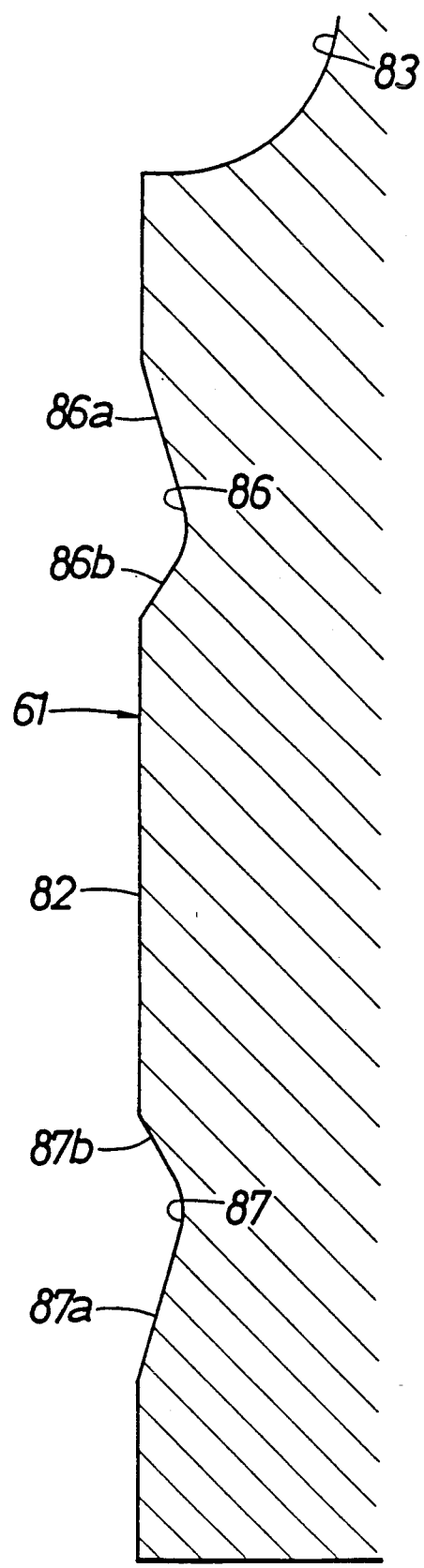

As clearly shown in FIG. 8, the first circumferential groove 86 is V-shaped in cross section, with a slant 86a thereof closer to the inner end of the second land 82 being formed gentler than a slant 86b on the opposite side. The second circumferential groove 87 is also V-shaped in cross section, with a slant 87a thereof closer to the outer end of the second land 82 being formed gentler than a slant 87b on the opposite side.

The second distributor valve 61 is disposed with the first land 81 directed radially outwardly of the cylinder block B.

Figure 9:
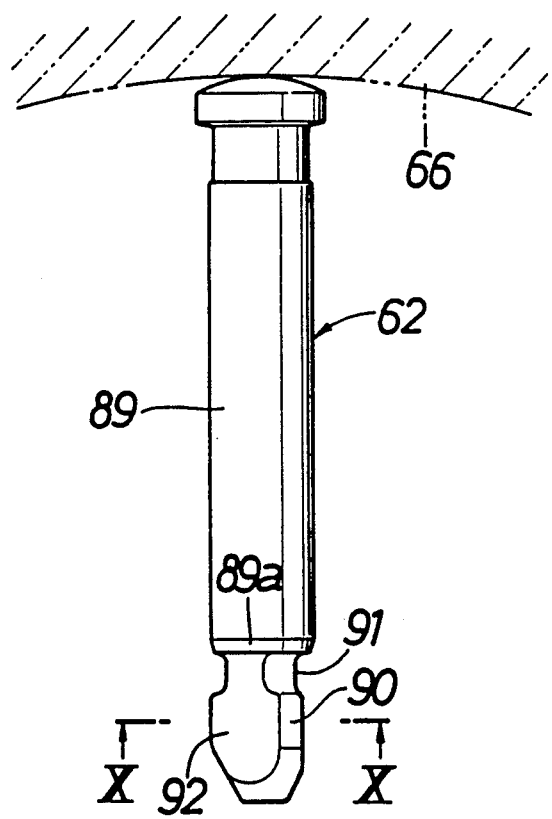
FIG. 9 is a side view of a clutch valve.
Figure 10:
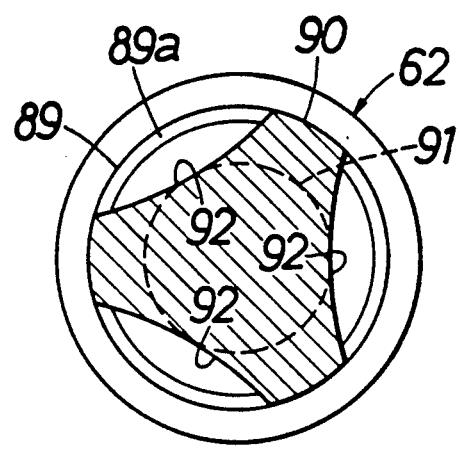
FIG. 10 is an enlarged sectional view taken along a line X—X in FIG. 9.

Secondly, the clutch valve 62, as shown in FIGS. 9 and 10, comprises a first land 89 having a longer axial length, a second land 90 having a shorter axial length, and an annular groove 91 extending between the land 89 and 90.

A tapered portion 89a is formed at that edge of the first land 89 which is closer to the annular groove 91, and the second land 90 is provided over its entire length with a plurality of notches 92.

The clutch valve 62 is disposed with the first land 89 directed radially outwardly of the cylinder block B.

Thus, if the motor cylinder 17 is rotated when the second eccentric ring 64 assumes the clutch-on position n (see FIG. 4), the second distributor valve 61 and the clutch valve 62 are reciprocally moved in the second valve bore 55 and the third valve bore 56 between the radially inner and outer positions in the cylinder block B with a stroke of a distance two times the eccentric amount $\epsilon_2$ by the second eccentric ring 64. In an expansion region Ex of the hydraulic motor M, the second distributor valve 61 is moved in the inner position to put the corresponding motor port b into communication with the outer oil passage 53 through the annular groove 83 and cut off the communication between such motor port b and the inner oil passage 52 by the second land 82, so that a high pressure working oil is supplied from the outer oil passage 53 into the cylinder bore 18 for the motor plunger 19 which is in its expansion stroke. In a shrinkage or contraction region Sh, the second distributor valve 61 is moved in the outer position to put the corresponding motor port b into communication with the inner oil passage 52 and to cut off the communication between such motor port b and the outer oil passage 53, so that the working oil is discharged into the inner oil passage 52 from the cylinder bore 18 for the motor plunger 19 which is in its contraction stroke.

On the other hand, the clutch valve 62 has the first land 89 extending across the outer oil passage 53 to cut off the communication between the inner and outer oil passages 52 and 53, as long as the reciprocation stroke thereof is equal to or less than a distance two times the second eccentric amount $\epsilon_2$.

Thus, the cylinder block B is rotated by the sum of a reaction torque received by the pump cylinder 7 from the pump swashplate 10 through the pump plunger 9 which is in its discharge stroke and a reaction torque received by the motor cylinder 17 from the motor swashplate 20 through the motor plunger 19 which is in its expansion stroke, and the rotational torque of the cylinder block B is transmitted from the output shaft 31 to the secondary reduction gear 3.

In this case, the shift ratio of the output shaft 31 relative to the cylindrical input shaft 5 is provided by the following expression:

$$\text{Shift ratio} = 1 + \frac{\text{Capacity of the hydraulic motor } M}{\text{Capacity of the hydraulic pump } P}$$

Accordingly, if the capacity of the hydraulic motor M is changed from zero to a certain value, the shift ratio can be changed from 1 to a certain necessary value. Moreover, the capacity of the hydraulic motor M is determined by the stroke of the motor plunger 19 and hence, the shift ratio can be changed in a continuously variable manner from 1 to a certain value by the tilting movement of the motor swashplate 20 from the upright position to a certain inclined position.

If the second eccentric ring 64 is then shifted into the clutch-off position f (see FIG. 4A), the second distributor valve 61 and the clutch valve 62 are reciprocally moved in the second valve bore 55 and the third valve bore 56 between the radially inner and outer positions in the cylinder block B with a stroke of a distance two times the eccentric amount $\epsilon_3$ by the second eccentric ring 64, as the motor cylinder 17 is rotated. In the inner position of the second distributor valve 61, the oil passages 52 and 53 are short-circuited through the annular groove 83 and the recessed groove 85, and in the outer position of the second distributor valve 61, the oil passages 52 and 53 are short-circuited through the recessed groove 85. Further, in the outer position of the clutch valve 62, the oil passages 52 and 53 are short-circuited through the annular groove 91 and the notch 92. Thus, the high pressure working oil is not supplied to the hydraulic motor M, and the transmission of power is interrupted between the hydraulic pump P and the hydraulic motor M. That is, a so-called clutch-off condition is provided.

In this event, both the second distributor valve 61 and the clutch valve 62 participate in the short-circuiting between the oil passages 52 and 53, as described above and therefore, the flow resistance in the short-circuited system is extremely small. Consequently, it is possible to suppress any pulsation of pressure due to the operation of the hydraulic pump P to provide a stable clutch-off condition.

In addition, since the large numbers of second distributor valves 61, 61 --- and clutch valves 62, 62 ---are alternately disposed circumferentially of the cylinder block B, so that they are driven by the common second eccentric ring 64, it is possible to avoid not only the complication of structure but also the increase in axial length of the cylinder block, despite the disposition of the clutch valves 62, 62 ---.

Description will now be made of returning of the second eccentric ring 64 from the clutch-off position f to the clutch-on position n.

In this event, when the eccentric amount of the eccentric ring 64 approaches $\epsilon_2$, the second distributor valve 61 brought into the radially inner position restricts the communication between the oil passages 52 and 53 by the semi-circular end 85b of the recessed groove 85 closer to the inner oil passage 52 and by the gentler slant 87a of the second circumferential groove 87, while the second distributor valve 61 brought into the radially outer position restricts the communication between the oil passages 52 and 53 by the semi-circular end 85a of the recessed groove 85 closer to the outer oil passage 53 and the gentler slant 86a of the first circumferential groove 86. Further, the clutch valve 62 brought into the radially outer position restricts the communication between the oil passages 52 and 53 by the tapered portion 89a of the first land 89. Such restrictions are gradually intensified with the movement of the second eccentric ring 64 toward the clutch-on position n depending upon natures of the semi-circular ends 85a and 85b and the slants 86a and 86b as well as the tapered portion 89a and hence, a good semi-clutch condition can be obtained during this time. As a result, the transmission of power between the hydraulic pump P and the hydraulic motor M can be restarted smoothly.

Such a semi-clutch condition is also in a region of the cam shaft 74 engaging the slant 75a at the corner of the slipper plate 75. Therefore, the movement of the second eccentric ring 64 can be gradually controlled by the rotation of the cam shaft 74, which enables the semi-clutch condition to be further easily obtained.

Referring again to FIG. 2, the output shaft 31 is centrally provided with a central oil passage 95, and an oil filter 96 is disposed in the central oil passage 95 at a location closer to an inlet thereof. A working oil in an oil reservoir 100 is supplied to the central oil passage 95 by a supply pump 99 driven from the cylindrical input shaft 5. An oil filter 101 is disposed immediately downstream of the supply pump 99.

A cylindrical valve body 102 opened at its opposite ends is received in the central oil passage 95 at a central portion thereof and fixed to the output shaft 31 by a communication pipe 103 which extends rectilineraly through the cylindrical valve body 102. The communication pipe 103 has a thorugh hole 104 opened into the cylindrical valve body 102 and is opened at its opposite ends into the inner oil passage 52 to place the interior of the cylindrical valve body 102 into communication with the inner oil passage 52.

An outer peripheral surface of the cylindrical valve body 102 is formed with a chamfered portion 105 permitting the communication between the opposite ends thereof. A pair of first check valves 106, 106 are disposed symmetrically in the cylindrical valve body 102 with the communication pipe 103 interposed therebetween for blocking the reverse flow of an oil from the inner oil passage 52 toward the central oil passage 95.

A supply oil passage 107 is provided in the output shaft 31 and the cylinder block B to connect the outer oil passage 53 and the central oil passage 95, and a second check valve 108 is provided in the supply oil passage 107 for blocking the reverse flow of the oil from the outer oil passage 53 toward the central oil passage 95.

Further, a radial orifice 109 is provided in place in the output shaft 31 for supplying a lubricating oil from the central oil passage 95 to various portions of the transmission T.

Thus, during a normal load operation in which the hydraulic motor M is hydraulically driven from the hydraulic pump P, if the pressure in the lower pressure inner oil passage 52 is reduced lower than that in the central oil passage 95 due to a leakage of the oil from the hydraulic circuit between the hydraulic pump P and the hydraulic motor M, the first check valves 106 are opened, permitting the working oil to be supplied from the central oil passage 95 to the inner oil passage 52. During this time, the working oil in the higher pressure outer oil passage 53 is blocked by the second check valve 108 from flowing therefrom toward the central oil passage 95.

During a reverse load operation, i.e., during engine-braking, the hydraulic motor M performs a pumping action, and the hydraulic pump P performs a motoring action. Hence, the outer oil passage 53 is brought to a lower pressure, and the inner oil passage 52 is brought to a higher pressure. Thus, if the pressure in the outer oil passage 53 is reduced lower than that in the central oil passage 95 due to a leakage of the oil, the second check valve 108 is opened, permitting the working oil to be supplied from the central oil passage 95 to the outer oil passage 53, and flowing of the working oil from the inner oil passage 52 to the central oil passage 95 is blocked by the first check valves 106.

In addition, the oil in the central oil passage 95 is supplied to the various portions of the transmission T while being limited in flow rate by the orifice 109 and therefore, the pressure in the central oil passage 95 cannot be reduced excessively due to such supplying. This ensures that any hindrance cannot be provided to the supplying of the working oil from the central oil passage 95 to the inner oil passage 52 and the outer oil passage 53.

What is claimed is:

1. A hydrostatic continuously variable transmission, comprising:
   a pump cylinder in a hydraulic pump and a motor cylinder in a hydraulic motor, said cylinders being coaxially integrally coupled with each other to form a cylinder block,
   an annular inner oil passage and an annular outer oil passage, which are formed in the cylinder block between a large number of cylinder bores provided in an annular arrangement in the pump cylinder and a large number of cylinder bores provided in an annular arrangement in the motor cylinder, so as to surround an axis of the cylinder block,
   a large number of first distributor valves disposed radiately in the cylinder block and adapted to be reciprocally moved radially of the cylinder block to put the large number of cylinder bores in the pump cylinder into alternate communication with said oil passages,
   a large number of second distributor valves disposed radiately in the cylinder block and adapted to be reciprocally moved radially of the cylinder block to put the large number of cylinder bores in the motor cylinder into alternate communication with said oil passages,
   a first eccentric ring engaged with the first distributor valves for providing the reciprocal movement to the first distributor valves in response to relative rotation between the cylinder block and an input member of the hydraulic pump, and a second eccentric ring engaged with the second distributor valves for providing the reciprocal movement to the second distributor valves in response to the rotation of the cylinder block, wherein said transmission further includes a large number of clutch valves arranged radiately with and circumferentially alternating with the second distributor valves in the cylinder block and adapted to be reciprocally moved between radially inner and outer positions in the cylinder block to short-circuit the oil passages when a reciprocation stroke of each clutch valve exceeds a given value, said clutch valves being engaged with the second eccentric ring together with the second distributor valves, and said second eccentric ring being movable between a clutch-on position providing a normal reciprocal movement to the second distributor valves and a clutch-off position moving the clutch valves reciprocally to a position to short-circuit the oil passages.

2. A hydrostatic continuously variable transmission according to claim 1, wherein each said clutch valve is provided with a restriction for gradually reducing an area of a short-circuited flow path between said oil passages as the second eccentric ring is displaced from a position adjacent the clutch-on position to the clutch-off position.

3. A hydrostatic continuously variable transmission according to claim 1, wherein each said second distributor valve is constructed to short-circuit said oil passages in the clutch-off position of the second eccentric ring.

4. A hydrostatic continuously variable transmission according to claim 3, wherein said second distributor valve is provided with a restriction for gradually reducing an area of a short-circuited flow path between said oil passages as said second eccentric ring is displaced from a position adjacent the clutch-on position to the clutch-off position.

* * * * *